Aug. 24, 1965
E. BERNHARDT  3,202,041
OPTICAL DEVICE FOR ORIENTING MONOCRYSTALS ALONG
THE AXIS OF THE CRYSTAL
Filed March 16, 1961
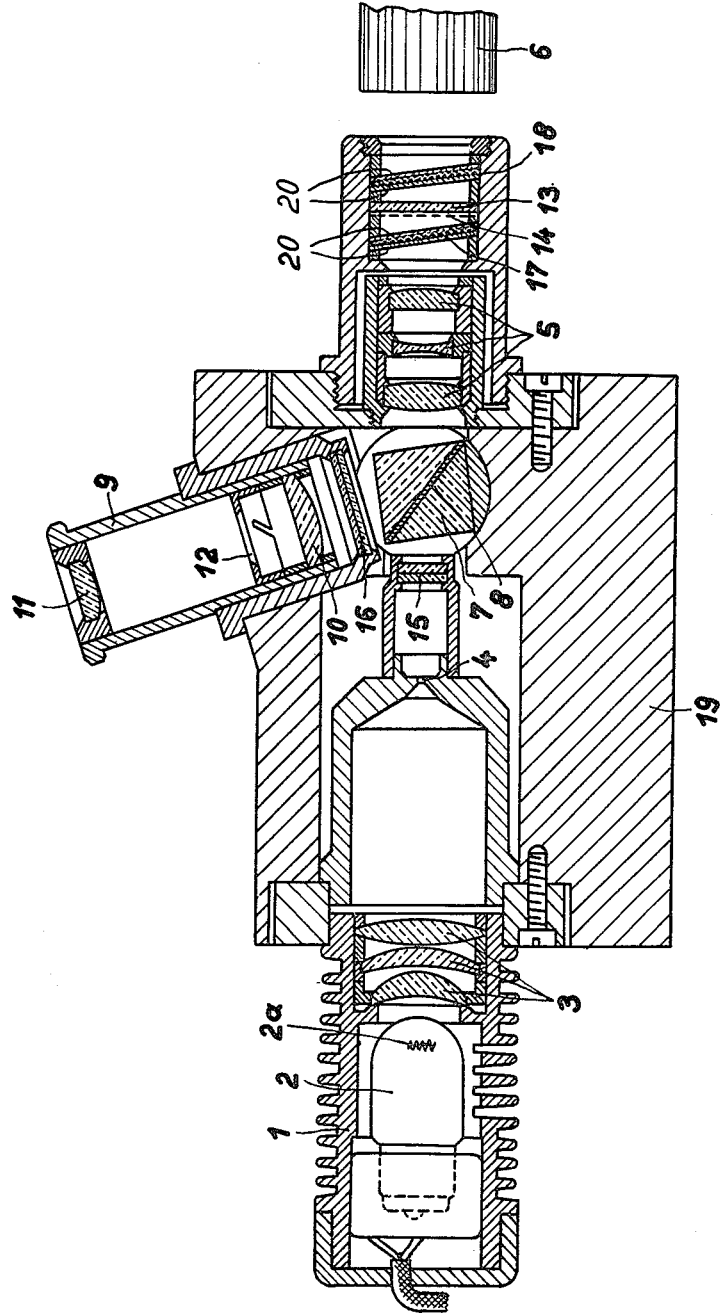

United States Patent Office 3,202,041
Patented Aug. 24, 1965

3,202,041
OPTICAL DEVICE FOR ORIENTING MONOCRYSTALS ALONG THE AXIS OF THE CRYSTAL
Eugen Bernhardt, Heidenheim (Brenz), Germany, assignor to Carl Zeiss, Oberkochen, Germany
Filed Mar. 16, 1961, Ser. No. 96,258
Claims priority, application Germany, Mar. 17, 1960, Z 7,883
6 Claims. (Cl. 88—14)

The invention relates to improvements in an optical device for orienting monocrystals along the axis of the crystal.

Devices for the orientation of monocrystals along their crystal axis play at present an important part in the art of semiconductors. Simple optical means make it possible to indicate the orientation of the crystal axes of semiconductor crystals, as for instance germanium and silicon, by means of their characteristic angle of incidence reflections on suitable etching structures. It is obviously reasonable to aline the crystals according to their angle of incidence reflections in an autocollimator telescope with the optical axis of the instrument and thereby to orient crystallographically the raw crystals for the saw cut.

It is an object of the invention to provide an optical device for the orientation of monocrystals along the crystal axis in the form of an autocollimator telescope comprising a source of light, a collimator diaphragm, a collimator objective, a division prism and an ocular, and having arranged in front of the collimator objective at that side which faces the object a plane parallel partially transmitting mirror plate which is at least approximately normally aligned to the optical axis.

The monocrystal to be oriented along its crystal axis is introduced into the parallel path of rays outside of the collimator objective. Thereby is produced, due to the reflection at the polished section of the crystal, which has been subjected to an etching procedure, an autocollimation image of the angle of incidence reflections in the image plane of the ocular. Since also the mirror plate is arranged in the parallel path of rays of the collimator objective, this mirror plate produces an autocollimation image of the collimator diaphragm in the image plane of the ocular. This image has the form of a luminous mark and serves as a mark for the optical axis of the collimator which axis is defined as the normal to the mirror plate. If by tilting of the crystal the characteristic angle of incidence reflection, for instance a three-point star when orienting the crystal to a (111)-axis, is centralized on the collimating mark, this means that a (111)-plane of the crystal is directed parallel to the mirror plate. The advantage of a collimating mark being regulated from the outside according to the present invention resides in that the otherwise rather elaborate manipulations necessary for the internal adjustment of the collimator can be dispensed with.

It is another object of the invention to improve the device by constructing the mirror plate as a color filter which on the side facing the collimator objective is provided with a reflecting layer which is approximately complementary reflective to the color of the filter. For instance, if the mirror plate is constructed as a green filter and that side of the mirror plate facing the collimator objective is provided selectively with a purple reflecting layer, then the ocular of the collimator shows simultaneously a purple collimation mark and a green image of the angle of incidence reflections of the crystal.

It is well known that the reflective power of the polished sections of semiconducting materials provided with structure etching is relatively low. For this reason any disturbing reflections have to be eliminated as radically as possible from the optical system of the collimator. It is therefore another object of the invention to arrange a polarizer in the path of rays of the collimator between the collimator diaphragm and the division prism, an analyzer between the division prism and the ocular, and a quarter-wave plate ($\lambda/4$ plate) at each side of the filter plate.

The operation of the device is as follows:

The light leaving the collimator diaphragm is plane-polarized by the polarizer. The reflections originating at the surfaces of the division prism or the collimator objective and which would blur the image in the ocular, are extinguished by the analyzer arranged between the division prism and the ocular, since the analyzer is placed in crossed position to the polarizer. The same would happen to the reflections to be observed which return from the mirror plate and from the crystal, unless there is arranged a quarter-wave plate at least between the collimator objective and the mirror plate. The well-known effect of the quarter-wave plate changes, however, the state of polarization of the light after the same has passed twice through the quarter-wave plate to such an extent that the light will not be extinguished by the analyzer but will pass. In this manner the desired reflections coming from the mirror plate and from the crystal are made visible in their full intensity, while the undesired reflections coming from the surfaces of the optical system of the collimator are eliminated.

As a rule, however, the reflective power of the selectively reflecting mirror layer is still quite high in comparison to the intensity of the angle of incidence reflections of the crystal, so that when employing only one quarter-wave plate the collimation mark will appear excessively bright. For this reason the invention provides the arrangement of two quarter-wave plates instead of the necessary one quarter-wave plate; one of these two quarter-wave plates is arranged in front of the mirror plate, the other one in rear of the mirror plate. The first quarter-wave plate is caused to be shifted in its vibration direction only about a small angle toward the polarization direction so that due to the crossed position of the polarizer and the analyzer the extinction of the reflection of the mirror layer is offset only to a small degree by the effect of this quarter-wave plate. In this manner the brightness of the collimation mark in the ocular image can be regulated to its most favorable degree. The second quarter-wave plate arranged between mirror plate and crystal is brought in customary manner into the 45° position to the vibration direction of the polarizer and the analyzer and thus effects that the image of the angle of incidence reflections appears in maximum brightness. It was found that the collimation image produced in this fashion and in which the color contrasts as well as the brightness contrasts are regulated to their optimum can be evaluated with increased accuracy.

Since the quarter-wave plates themselves may cause undesirable reflections, the invention provides that the quarter-wave plates are arranged inclined to the optical axis of the collimator. If the angle of inclination is sufficiently large, the undesired reflection images arising at the quarter-wave plates will lie outside of the image plane of the ocular. The invention provides the same measure also for the division prism, because the extinction of the undesired reflections from the prism surface by the effect of the polarizer and the analyzer alone is, as known from experience, not so complete as to be satisfactory.

One embodiment of the invention is illustrated in a sectional view in the accompanying drawing.

Referring to the drawing, a lamp housing 1 is provided with an incandescent lamp 2, the filament 2a of which is projected by a three-lens condenser 3 into a collimator diaphragm 4. The collimator diaphragm 4 is arranged in the background focal point of a three-lens collimator objective 5 which projects an image of the collimator diaphragm 4 into infinity. In the parallel path of rays of the collimator objective 5 is placed the crystal 6 whose axial orientation is to be determined. After reflection on the crystal 6 an autocollimation image of the crystal reflections appears in the plane of the collimator diaphragm 4. A division prism 7 arranged between the collimator diaphragm 4 and the collimator objective 5 and having a partially transmitting reflecting layer 8 permits the observation of the autocollimation image by the Huygens ocular 9. This ocular 9 is composed of a field lens 10, an ocular lens 11 and an image field diaphragm 12. In the parallel path of rays of the collimator objective 5 is further arranged a plane parallel mirror plate 13 constructed as a green filter and having on its side facing the collimator objective 5 a reflective layer 14 selectively reflecting in purple. This mirror plate 13 effects that by autocollimation an image of the collimator diaphragm 4 in form of a purple illuminating mark appears in the plane of the image plane diaphragm 12. Furthermore, a filter polarizer 15 is arranged between the collimator diaphragm 4 and the division prism 7, and between the prism 7 and the ocular 9 is arranged a filter analyzer 16. At each side of the mirror plate 13 are arranged the quarter-wave plates 17, 18 respectively, which quarter-wave plates are double refracting foils cemented between cover glasses 20. The two quarter-wave plates 17, 18 and the division prism 7 are arranged inclined in the path of rays of the collimator. All of the optical elements of the autocollimator telescope are arranged in a common housing 19.

What I claim is:

1. An optical device comprising an autocollimator for orienting specimens of monocrystals along their crystal axis, comprising an optical system having an optic axis including a source of light, a collimator diaphragm having a relatively restricted small round aperture through which rays of light are directed from said source, a collimator objective spaced from said diaphragm, a division prism between said objective and aperture, an ocular offset from said prism for receiving reflected light images from said prism, and a plane parallel partially transmitting mirror plate which is substantially normally aligned to the optical axis and arranged in front of said collimator objective, said mirror plate reflecting a light image of said aperture to said division prism and then to said ocular in the form of a small dot mark centered in said ocular while another light image of said crystal axis is reflected from said specimen through said mirror plate to said division prism and then to said ocular with the small dot mark light image of said aperture indicating the optical axis of said autocollimator, said division prism being oriented to reflect both of said light images toward said ocular whereby manipulation and orientation of said specimen will cause the reflected image of said crystal axis to be brought into registry and centered with the small centered dot mark image of said aperture.

2. An optical device according to claim 1, in which said mirror plate is a color filter and is provided on the said facing said collimator objective with a reflective layer which reflects approximately complementary to the color of the filter.

3. An optical device according to claim 1, including a polarizer arranged in the path of rays of said collimator between said collimator diaphragm and said division prism, an analyzer arranged between said division prism and said ocular, and a quarter-wave plate at each side of said mirror plate which is a color filter.

4. An optical device according to claim 1, including a polarizer arranged in the path of rays of said collimator between said collimator diaphragm, and said division prism, an analyzer arranged between said division prism and said ocular, and a quarter-wave plate at each side of said mirror plate which is a color filter, said quarter-wave plates and said division prism being arranged inclined to the optical axis of said collimator.

5. An optical device for determining the crystal axis of specimens of monocrystals comprising an auto-collimator telescope having aligned first and second tubular portions and an oculator tube extending at an angle to the axis of said tubular portions, a collimator diaphragm in the first of said tubular portions having a relatively small restricted aperture concentric to the optical axis of said tubular portions, an objective in the second of said tubular portions, a light source in the first named tubular portion for directing a ray of light through said aperture and through said objective, a division prism between said aperture and objective and arranged between said tubular portions, a polarizer between said diaphragm and division prism, an analyzer in said ocular tube to extinguish surface reflections originating at the surfaces of said division prism from being reflected to said ocular, a composite mirror plate mounted in the second tubular portion and arranged between the objective and a specimen to be observed, said mirror plate being arranged to reflect a light image of said aperture to said ocular to indicate the axis of said telescope and also permitting a reflected light image of the axis of said specimen to be reflected for observation through said ocular, the division prism reflects both the image of the aperture from the mirror plate and from the surface of the specimen toward said ocular, whereby manipulation of said specimen during observation will cause an image of the crystal axis of said specimen to be observed in said ocular and brought into alignment with the centered image of said diaphragm while the same are viewed in said ocular.

6. An optical device for indicating and aligning the crystal axis of specimens of monocrystals with a fixed reference point, comprising an auto-collimator telescope having first and second aligned tubular portions and an ocular tube extending at an angle to the axis of said tubular portions, a collimator diaphragm in the first one of said tubular portions having a relatively small restricted round aperture, a light source adjacent said diaphragm for projecting light rays through said aperture in the direction of said second tubular portion, an objective lens system mounted in the second of said tubular portions adapted to project a light beam through the open end of said second tubular portion in the direction of a microcrystal specimen being inspected, a division prism between said diaphragm and objective, a polarizer between said diaphragm and division prism, an analyzer in said ocular tube to prevent reflection of light from said source toward said ocular, a composite semi-transparent mirror arranged adjacent said objective to reflect a small round image of said aperture on said ocular and form a brightly illuminated center image mark thereon to indicated the optic axis of said telescope, said division prism reflecting the image from said aperture from the mirror plate and from the surface of said specimen and being oriented to reflect said images toward said ocular, and quarter wave plates mounted on opposite sides of said mirror plate and arranged to permit the passage of reflected image rays of an image of the crystal axis of said specimen of sufficient brilliance to be observed in said ocular, whereby orientation of said specimen to determine positions will cause the reflection image from the crystal axis of said specimen to be brought into registry with the round image mark of said diaphragm indicating the optic axis of said telescope when both images are observed through said ocular.

(References on following page)

References Cited by the Examiner

UNITED STATES PATENTS

| | | | |
|---|---|---|---|
| 1,238,775 | 9/17 | Ives. | |
| 1,885,642 | 11/32 | Strong. | |
| 2,074,106 | 3/37 | Foster | 88—14 X |
| 2,303,906 | 12/42 | Benford et al. | 88—65 X |
| 2,318,705 | 5/43 | Morgan. | |
| 2,516,905 | 8/50 | Osterberg et al. | 88—65 X |
| 2,601,175 | 6/52 | Smith | 88—65 X |
| 2,633,051 | 3/53 | Davis | 88—2.3 |
| 3,124,638 | 3/64 | Loro | 88—14 |

OTHER REFERENCES

Archer: Optical Constants of Germanium, Physical Review vol. 110, No. 2, Apr. 15, 1958.

Blanke et al.: Optik, vol, 14, issue No. 718, pages 361–368, July–August 1957.

JEWEL H. PEDERSEN, *Primary Examiner.*

EMIL G. ANDERSON, *Examiner.*